Patented May 13, 1924.

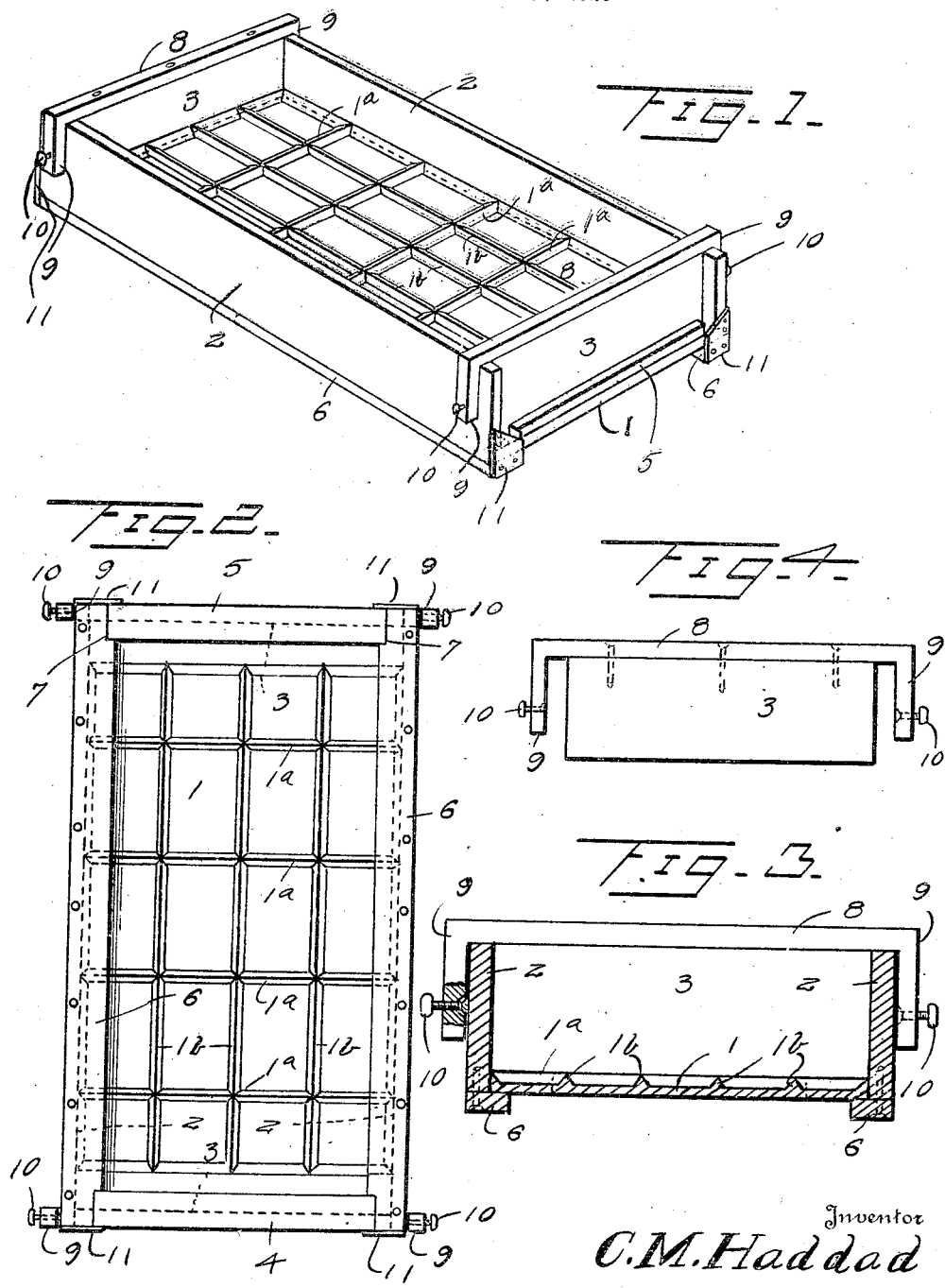

1,494,237

UNITED STATES PATENT OFFICE.

CONSTANTINE M. HADDAD, OF TYLER, TEXAS.

COLLAPSIBLE AND ADJUSTABLE CANDY MOLD OR BOARD.

Application filed May 26, 1923. Serial No. 641,694.

*To all whom it may concern:*

Be it known that I, CONSTANTINE M. HADDAD, a citizen of the United States, residing at Tyler, in the county of Smith and State of Texas, have invented certain new and useful Improvements in a Collapsible and Adjustable Candy Mold or Board; and I do hereby declare the following to be a full, clear, and exact description of the invention, such as will enable others skilled in the art to which it appertains to make and use the same.

The invention has for its chief object to provide a mold or candy board for the use of confectioners, bakers and others whereby to receive a batch, the adjustability of the device adapting the same for batches of different sizes, as well as providing for dividing the batch and keeping the parts separated so that each may be differently treated, colored or flavored, and the collapsible feature providing for ready dismemberment of the device for convenience of storing, cleaning or other desired purpose.

A further object of the invention is the provision of a candy mold or board of the character stated having a bottom which is plain or smooth on one side and ribbed on the other and which may be so arranged as to present its plain or smooth side or its ribbed side uppermost, depending upon whether it is desired to provide the batch with a smooth or fancy upper surface.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a perspective view of a mold or candy board embodying the invention, the ribbed side of the bottom being shown disposed uppermost, Figure 2 is an inverted plan view of the mold or candy board, the bottom being shown with its ribbed side disposed lowermost, Figure 3 is a transverse sectional view of the mold or candy board as shown in Figure 1, and Figure 4 is a detail plan view of a partition or end gate.

Corresponding and like parts are referred to in the following description and designated in the several views of the drawings by like reference characters.

The device comprises a bottom 1, sides 2, and crosspieces 3 which may serve as end gates or closures and partitions, it being understood that there may be as many of the parts 3 as required to provide compartments for receiving parts of a batch. The bottom 1 has one side thereof plain or smooth, and its other side is provided with transversely and longitudinally extending ribs $1^a$ and $1^b$. When it is desired to provide the batch with a smooth upper surface the bottom 1 is arranged with its smooth side uppermost, and when it is desired to provide the batch with a fancy upper surface the bottom is arranged with its ribbed side uppermost. The ribs $1^a$ and $1^b$ also strengthen and reinforce the bottom 1. Cleats 4 and 5 are secured in any manner to the ribbed side of the bottom 1, and are disposed transversely thereof. Longitudinal strips 6 are secured to the lower edges of the sides 2 and project laterally so as to underlap the longitudinal marginal edges of the bottom 1. When the ribbed side of the bottom 1 is disposed lowermost, the strips 6 engage the ends of the cleats 4 and 5, and said strips are notched as indicated at 7 to receive the ends of the cleats whereby relative longitudinal movements of the sides and bottom are prevented when the parts are assembled.

The crosspieces 3 are adapted to rest upon the bottom 1 and come between the sides 2, thereby preventing inward displacement of the sides. A bar 8 is attached to the top edge of the crosspiece and its ends are bent to extend downwardly and embrace the sides 2, as indicated at 9. A set screw 10 is threaded into a lateral opening formed in each of the bent ends 9 of the bar and its inner end is adapted to engage the sides 2 and secure the parts in located position. It is to be understood that the distance between adjacent crosspieces 3 may be varied according to the size of the batch and in the event of it being required to divide the batch, one or more crosspieces may be arranged between the end crosspieces to provide a compartment for receiving each divisional part of the batch.

To prevent the bottom 1 and sides 2 from having any relative endwise movements when the smooth side of the bottom is disposed lowermost, plates 11 are secured to the sides 2 and strips 6 for engagement with the ends of the bottom 1, as clearly shown in Figure 1 of the drawings.

The construction is such as to admit of the device being easily and quickly dismembered for convenience of storing and cleaning and the crosspieces may be adjusted to the size of the batch or the particular nature of the work in hand.

What is claimed is:—

1. In a device of the character specified, comprising a bottom, sides, crosspieces resting upon the bottom and engaging the inner faces of the sides, and a bar attached to each of the crosspieces and having opposite ends bent to engage the outer faces of the sides and retain the parts in place.

2. In a device of the character specified, comprising a bottom, sides, crosspieces resting upon the bottom and engaging the inner faces of the sides, a bar attached to each of the crosspieces and having opposite ends bent to engage the outer faces of the sides and retain the parts in place, and set screws applied to the bent ends of the bar to enable the clamping of the sides against the ends of the crosspieces.

3. A device of the character specified, comprising a bottom, sides having inwardly disposed elements at their lower edges to engage marginal portions of the bottom, crosspieces adapted to rest upon the bottom and engage the inner faces of the sides, bars secured to the crosspieces and having their ends bent to extend along the outer faces of the sides, and set screws applied to the bent ends of the bars to clamp the sides against the ends of the crosspieces.

4. A device of the character specified, comprising a bottom, transverse cleats applied to the bottom, side pieces, strips attached to the lower edges of the side pieces and underlapping the bottom and notched to receive said cleats whereby to prevent longitudinal displacement of the sides, crosspieces adapted to rest upon the bottom and engage the inner faces of the sides, and bars attached to the top edges of the crosspieces and having opposite ends bent to extend along the lower faces of the sides, and set screws applied to bent ends of the bars to engage the sides and clamp the same against the ends of the crosspieces, whereby to secure the parts when assembled.

5. A device of the character specified, comprising a bottom, transverse cleats secured to the bottom, sides, strips secured to the sides and underlapping the bottom and engaging said cleats to hold the bottom and sides against relative endwise movements, and crosspieces.

6. A device of the character specified, comprising a bottom, sides, strips secured to the sides and underlapping the bottom, and plates secured to the sides and engaging the bottom to prevent it and the sides from having any endwise movements, and crosspieces.

In testimony whereof I affix my signature in presence of two witnesses.

CONSTANTINE M. HADDAD.

Witnesses:
 S. M. COHEN,
 JOS. R. HARRELL.